United States Patent
Yamada

(10) Patent No.: US 8,258,717 B2
(45) Date of Patent: Sep. 4, 2012

(54) HIGH PRESSURE DISCHARGE LAMP LIGHT SOURCE DEVICE

(75) Inventor: Koji Yamada, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/750,022

(22) Filed: Mar. 30, 2010

(65) Prior Publication Data

US 2010/0253236 A1  Oct. 7, 2010

(30) Foreign Application Priority Data

Apr. 1, 2009 (JP) ................. 2009-088904

(51) Int. Cl.
    *H05B 37/02* (2006.01)
(52) U.S. Cl. ......... 315/291; 315/287; 315/297; 315/300
(58) Field of Classification Search ........... 315/291, 315/300, 297, 246, 307, 287; 353/85
    See application file for complete search history.

(56) References Cited

U.S. PATENT DOCUMENTS

| | | | |
|---|---|---|---|
| 4,376,911 A * | 3/1983 | Kaneda | 315/244 |
| 2005/0206326 A1 | 9/2005 | Suzuki et al. | |
| 2008/0315782 A1 * | 12/2008 | Hirao | 315/224 |
| 2009/0009095 A1 | 1/2009 | Pekarski et al. | |
| 2009/0256488 A1 * | 10/2009 | Philiben et al. | 315/241 S |

FOREIGN PATENT DOCUMENTS

| | | |
|---|---|---|
| JP | 2005-353343 A | 12/2005 |
| JP | 2007-87637 A | 4/2007 |
| JP | 4223760 B2 | 11/2008 |

* cited by examiner

*Primary Examiner* — Jacob Y Choi
*Assistant Examiner* — Henry Luong
(74) *Attorney, Agent, or Firm* — Roberts Mlotkowski Safran & Cole, P.C.; David S. Safran

(57) ABSTRACT

In order to maintain a stable arc and avoid wear of the projections of electrode tip ends even if the lamp is lighted with a lamp power of at most 70% of the nominal electric power, a high pressure discharge lamp light source device is provided with a power supply device for supplying alternating current to the high pressure discharge lamp in a low electric power lighting mode having a defined current value in the range of 40 to 70% of a nominal electric power consumption, and wherein the power supply device, in the low electric power lighting mode supplies an alternating current with a low frequency which is lower than the steady-state lighting frequency, and supplies a boost current at least two times during a half cycle of the alternating current with a low frequency which is larger than the alternating current with a low frequency.

2 Claims, 13 Drawing Sheets

Waveform (A) Nominal electric power lighting

Waveform (B) Low electric power lighting

Boost rate BR = $I_{b1}/I_{a1}$
Boost rate BR = $I_{b2}/I_{a2}$

Alternating current Ih with basic frequency $f_H$

Alternating current IL with a low frequency $f_L$

Fig. 5

| | No. | Explanation | Waveform | Elect..temperature | Electrode state |
|---|---|---|---|---|---|
| (a) | None | Nominal electric power lighting (reference information) Sufficient current is supplied with regard to the electrode size, and the arc is stable | ① | | ③ ④ ③ ④ |
| (b) | A | Low electric power lighting<br><br>The current is insufficient with regard to the electrode size | ① | ② ⟋⟍ Time | ③ ④ ③ ④ |
| (c) | A | Low electric power lighting (prior art technique) Because of lack of current secondary projections start to form. When lighting is continued in this state, flicker develops. | ① | ② ⟋⟍ Time | ③ ④ ④ ③ ⑤ ⑤ |
| (d) | B | Low electric power lighting<br><br>A boost current is supplied to the electrode on one side and the secondary projection on the one side vanishes. | ① | ② ⟋⋁⟍ Time | ③ ④ ④ ③ ⑤ |

①     Current waveform
②     Electrode temperature
③     Spherical part
④     Primary projection
⑤     Secondary projection

Fig. 6

| | No. | Explanation | Waveform | Elect. temperature | Electrode state |
|---|---|---|---|---|---|
| (e) | C | Low electric power lighting<br><br>A boost current is also supplied to the electrode on the other side and the secondary projections on both electrodes vanish. | | | |
| (f) | D | Low electric power lighting<br><br>A boost current is supplied a plurality of times at the half wave during the low frequency period, the electrode temperature increases significantly, and tungsten (W) evaporates. | | | W atoms, ions |
| (g) | E | Low electric power lighting<br>The polarity of the electrode on the side already having been supplied with the boost current is changed, and W is attracted to the electrode and accumulates at the primary projection. The electrode on the opposite side behaves as in D. | | | W atoms, ions \|W atoms, ions accumulate at electrode |
| (h) | A | Low electric power lighting<br><br>Also at the electrode on the other side the same behavior as in E occurs and the growth of the projections on both sides is effected. | | | W atoms, ions accumulate at electrodes |

①     Current waveform
②     Electrode temperature
③     Spherical part
④     Primary projection Drive signal generator output Boost signal Full-bridge output

| Alternating current Ih | Basic frequency fH | 740 Hz |
|---|---|---|
| | Boost insertion period Ta | 0.0014 s |
| | Boost width A | 0.0007 s |
| Alternating current IL | Low frequency fL | 92.5 Hz |
| | Low frequency insertion period TL | 0.1 s |
| | Boost insertion period Tb | 0.0014 s |
| | Boost width B | 0.0007 s |
| | Ratio of boost current Ib to base current Ia | 2.2 times |

| Alternating current Ih | Basic frequency fH | 740 Hz |
|---|---|---|
| | Boost insertion period Ta | 0.0027 s |
| | Boost width A | 0.0007 s |
| Alternating current IL | Low frequency fL | 92.5 Hz |
| | Low frequency insertion period TL | 0.1 s |
| | Boost insertion period Tb | 0.0007 s |
| | Boost width B | 0.0007 s |
| | Ratio of boost current Ib to base current Ia | 2.0 times |

| Alternating current Ih | Basic frequency fH | 370 Hz |
|---|---|---|
| | Boost insertion period Ta | 0.0027 s |
| | Boost width A | 0.0014 s |
| Alternating current IL | Low frequency fL | 250 Hz |
| | Low frequency insertion period TL | 0.05 s |
| | Boost insertion period Tb | 0.0014 s |
| | Boost width B | 0.0007 s |
| | Ratio of boost current Ib to base current Ia | 2.4 times |

| | | |
|---|---|---|
| Alternating current Ih | Basic frequency fH | 740 Hz |
| | Boost insertion period Ta-1 | 0.0014 s |
| | Boost width A-1 | 0.0007 s |
| | Boost insertion period Ta-2 | 0.0063 s |
| | Boost width A-2 | 0.0007 s |
| Alternating current IL | Low frequency fL | 92.5 Hz |
| | Low frequency insertion period TL | 0.1 s |
| | Boost insertion period Tb | 0.0007 s |
| | Boost width B | 0.0007 s |
| | Ratio of boost current Ib to base current Ia | 2.2 times |

Fig. 13

| | Lamp configuration, lighting condition | | | | | A: Lighting by known technique (only low frequency insertion) | | | |
|---|---|---|---|---|---|---|---|---|---|
| No. | Rated power (W) | Lighting power (W) | Power rate (lighting power/rated power) | Lamp voltage (V) | Feed current (A) | Lighting base frequency (Hz) | Low frequency (Hz) | Low frequency (Hz) | Flicker |
| (1) | 200 | 144 | 72% | 90 | 1.60 | 460 | 46.5 | 0.1 | × |
| (2) | | 128 | 64% | 80 | 1.60 | | | | × |
| (3) | | 120 | 60% | 75 | 1.60 | | | | × |
| (4) | | 112 | 56% | 70 | 1.60 | | | | × |
| (5) | | | | 90 | 1.24 | | | | × |
| (6) | 230 | 184 | 80% | 100 | 1.84 | 370 | 46.5 | 0.1 | × |
| (7) | | 173 | 75% | 95 | 1.82 | | | | × |
| (8) | | | | 105 | 1.65 | | | | × |
| (9) | | 120 | 52% | 70 | 1.71 | | | | × |
| (10) | | | | 90 | 1.33 | | | | × |
| (11) | | | | 100 | 1.20 | | | | × |
| (12) | 275 | 220 | 80% | 100 | 2.20 | 370 | 46.5 | 0.1 | × |
| (13) | | 192 | 70% | 100 | 1.92 | | | | × |
| (14) | | 170 | 62% | 80 | 2.13 | | | | × |
| (15) | | | | 90 | 1.89 | | | | × |
| (16) | | 150 | 55% | 80 | 1.88 | | | | × |

| | B: Lighting by the present invention | | | | | | | | |
|---|---|---|---|---|---|---|---|---|---|
| | Alternating current Ih | | | Alternating current IL | | | | | |
| No. | Base frequency (Hz) | Boost insertion period Ta (s) | Boost width A (s) | Low frequency fL (Hz) | Low frequ. insertion period (s) | Boost insertion period Tb (s) | Boost width B (s) | Boost rate | Flicker |
| (1) | 740 | 0.0014 | 0.0007 | 92.5 | 0.1 | 0.0014 | 0.0007 | 2.2 | ○ |
| (2) | | | | | | | | | ○ |
| (3) | | | | | | | | | ○ |
| (4) | | | | | | | | | ○ |
| (5) | 925 | 0.0011 | 0.0005 | 92.5 | 0.05 | 0.0011 | 0.0005 | 2.7 | ○ |
| (6) | 370 | 0.0027 | 0.00014 | 250 | 0.05 | 0.0014 | 0.0007 | 2.4 | ○ |
| (7) | | | | | | | | | ○ |
| (8) | | | | | | | | | ○ |
| (9) | | | | | | | | | ○ |
| (10) | 925 | 0.0011 | 0.0005 | 92.5 | 0.05 | 0.0011 | 0.0005 | 2.7 | ○ |
| (11) | | | | | | | | | ○ |
| (12) | 370 | 0.0027 | 0.00014 | 46.5 | 0.1 | 0.0027 | 0.00014 | 2 | ○ |
| (13) | | | | | | | | | ○ |
| (14) | | | | | | | | | ○ |
| (15) | 740 | 0.0027 | 0.0007 | 92.5 | 0.1 | 0.0007 | 0.0007 | 2 | ○ |
| (16) | | | | | | | | | ○ |

Boost rate = boost current Ib/base current Ia
both for alternating currents Ih and IL Nominal electric power lighting mode Low electric power mode (initial)

Low electric power mode

HIGH PRESSURE DISCHARGE LAMP LIGHT SOURCE DEVICE

BACKGROUND OF THE INVENTION

1. Field of the Invention

The present invention relates to a high pressure discharge lamp light source device and particularly to a high pressure discharge lamp light source device which is capable of a stable lighting even if the lamp power is reduced to 40 to 70% of the nominal electric power consumption, and which, at the same time, can avoid wear of the electrodes.

2. Description of Related Art

High pressure discharge lamps, wherein at least 0.20 mg/mm$^2$ mercury are enclosed in the interior of the light emission tube are known. Among projector devices in which such high pressure discharge lamp light source devices are suitably used, projectors employing a so-called 'eco mode' which uses less electric power than the nominal electric power have become common. The known 'eco mode' is a mode using electric power which has been suppressed to an amount of approximately 70 to 80% of the nominal electric power. It is, in other words, a mode of 'lighting with low electric power'.

During the duration of such an eco mode the temperature of the electrode tip ends decreases because of the constraint of the electric power applied to the electrode tip ends, the position of the arc becomes unstable, and the occurrence of flicker is promoted. Techniques for the suppression of flicker in the above mentioned lamps are known, for example, from JP-A-2006-059790 and corresponding US 2005/0206326 A1 and JP-A-2008-509518 and corresponding US 2009/0009095 A1, which, however, do not improve the flicker during this low electric power lighting mode.

The technique stated in JP-A-2006-059790 and corresponding US 2005/0206326 A1 is characterized by the lighting frequency in the alternating current lighting mode. The frequency is controlled and a projection of the electrode tip end is formed projecting at the electrode tip end, and the arc is stabilized by rendering this projection the starting point of the arc. For the arc stabilization it is necessary that the size of the projection of the electrode tip end is controlled to a desired state according to the electric power, and one of the control methods is to change the drive frequency.

It is known that the projection becomes thick at a low frequency and thin at a high frequency, but the projection cannot be maintained by only repeating the waveform. With regard to this problem, the lighting frequency at which the maintenance and the stabilization of the projection can be accomplished is examined in the technique of JP-A-2006-059790 and corresponding US 2005/0206326 A1, and a stabilization of the arc is expected. By means of the above mentioned technique it was possible to maintain the arc stable even in a low electric power lighting mode such as the known eco mode.

In recent years, the needs have increased for projector devices to utilize a 'brightness adjustment mode' which employs a dimming function using a reduction of the lamp current according to the screen and an increase of the contrast, or a 'super-eco mode' using a further decrease of the electric power. Because of this situation, the lamp power is further constrained at the time of low electric power, and concretely a reduction of up to 40 to 70% of the nominal power consumption is necessary. But when the electric power is such decreased and reduced to less than 70% of the nominal power lighting, the arc becomes unstable even if measures are taken using generally known techniques, and before long flicker occurs.

The reason is explained in the following with regard to FIG. 14. In FIG. 14, 101 and 102 are respectively spherical parts of electrodes provided in the light emission tube of a high pressure discharge lamp, 101a and 102a are projections formed at the tip ends of the spherical parts, and 103 is the arc.

When lighting with the nominal electric power, the arc 103 is maintained by means of projection portions 101a, 102a with a relatively small volume provided beforehand at the tip ends of the spherical parts 101, 102 as shown in FIG. 14(a). At this time, the size of the projections 101a, 102a and the size of the electric power are balanced, the electrode tip end parts are maintained at a high temperature and the electron release is rendered easy.

When using the low electric power lighting mode with at most 70% of the nominal electric power, the temperature of the tip end parts decreases with the decrease of the electric power. Therefore, the electrode tip end temperature becomes too low with this size of the projections, a stable thermal electron release becomes impossible and it becomes impossible to maintain the arc 103 for a long time.

When the low temperature state of the electrode tip ends continues, the starting point of the arc 103 at the projection tip end moves with a short temporal cycle and, when having moved, forms another small projection (secondary projection). Resulting from the repetition of the movement of the arc 103 and the forming of a projection, a plurality of secondary projections is formed, and as shown in FIGS. 14(b) and (c), the arc 103 moves between the secondary projections.

When this situation occurs, the time of stay of the starting point of the arc at these secondary projections becomes long and the starting point of the arc moves between the secondary projections with a long temporal cycle. The reason for the time of stay of the starting point of the arc at a secondary projection becoming long is that the secondary projection reaches a high temperature because of its small size and a thermal electron release becomes possible. But when the size is too small, it cannot be maintained for a long time and wears off by evaporation, and when the distance (arc gap) between another secondary projection and the opposing electrode tip end becomes smaller, the starting point of the arc moves there.

The forming of secondary projections, the repetition of the forming and disappearance, the impossibility to maintain the arc at a specified position, and the movement of the starting point appear as flicker. Generally, humans do not perceive light fluctuations with a short cycle (>50 Hz), but light fluctuations with a long cycle (<50 Hz) are perceived. When the flicker of the lamp becomes significant, a flicker in the image projected to the screen appears, which is felt as unpleasant.

When a low electric power lighting mode with at most 70% of the nominal electric power is used, as stated above the temperature of the tip end part decreases together with the decrease of the electric power, the arc cannot be maintained at a constant position, the starting point moves, and flicker occurs.

SUMMARY OF THE INVENTION

This invention was made in consideration of the situation described above; the object of this invention being to provide a high pressure discharge lamp light source device in which the projections of the electrode tip ends are maintained in the ideal condition, a stable arc can be maintained and wear of the projections of the electrode tip ends can be avoided even if the lamp is lighted with a lamp power of at most 70% of the nominal electric power.

With the present invention, the object mentioned above is solved as follows: In a high pressure discharge lamp light source device comprising a high pressure discharge lamp, wherein a pair of electrodes at the tip ends of which a projection is formed are arranged oppositely to each other with a spacing of at most 2.0 mm in a discharge vessel made from quartz glass and at least 0.20 mg/mm$^3$ mercury and a halogen are enclosed in this discharge vessel, and a power supply device supplying alternating current to this discharge lamp, the power supply device being adapted to drive said high pressure discharge lamp switchable between a nominal electric power lighting mode and a low electric power lighting mode in which the lamp is driven with an electric power value in the range of 40 to 70% as to the nominal power consumption.

In said low electric power lighting mode, an alternating current with a steady-state lighting frequency selected from the range between 100 Hz and 5 kHz and an alternating current with a low frequency the frequency of which being lower than the alternating current with the steady-state lighting frequency are generated alternatingly for the high pressure discharge lamp, and while this alternating current with a low frequency is supplied a boost current having a current value which is larger than the current value of the alternating current with a low frequency is supplied two or more times during a half cycle of this alternating current with a low frequency.

Also during the supply of said alternating current with the steady-state lighting frequency, a second boost current having a current value which is larger than the current value of the alternating current with the steady-state lighting frequency is supplied.

With the present invention, the following results can be obtained.

As a boost current with a current value which is larger than the current value of the alternating current with a low frequency is supplied during the supply of the alternating current with a low frequency, no plurality of secondary projections is formed and a stabilization of the arc can be realized even in the low electric power lighting mode with at most 70% of the nominal power.

As the boost current is supplied two or more times during a half cycle of the alternating current with a low frequency, the electrode temperature can be increased even more by the second boost. Therefore, the tungsten being the constituting material of the spherical part of the electrodes is evaporated and adheres to the projection tip ends, by means of which a wear of the projections of the electrode tip ends can be avoided.

By means of supplying a second boost current having a current value which is larger than the current value of the alternating current with the steady-state lighting frequency also during the supply of the alternating current with the steady-state lighting frequency, the stabilization of the arc can be realized also in the low electric power lighting mode and the brightness difference between the lighting with the alternating current with the steady-state frequency and the lighting with the alternating current with a low frequency can be reduced.

BRIEF DESCRIPTION OF THE DRAWINGS

FIG. 5 is a schematic view (1) explaining the reasons why the forming, maintenance and growth of the projections is possible.

FIG. 6 is a schematic view (2) explaining the reasons why the forming, maintenance and growth of the projections is possible.

FIG. 13 is a table showing the test results for a comparison of the case of inserting only a low frequency and the case of supplying a boost current at the time of the low electric power lighting.

DETAILED DESCRIPTION OF THE DRAWINGS

Figure 1:
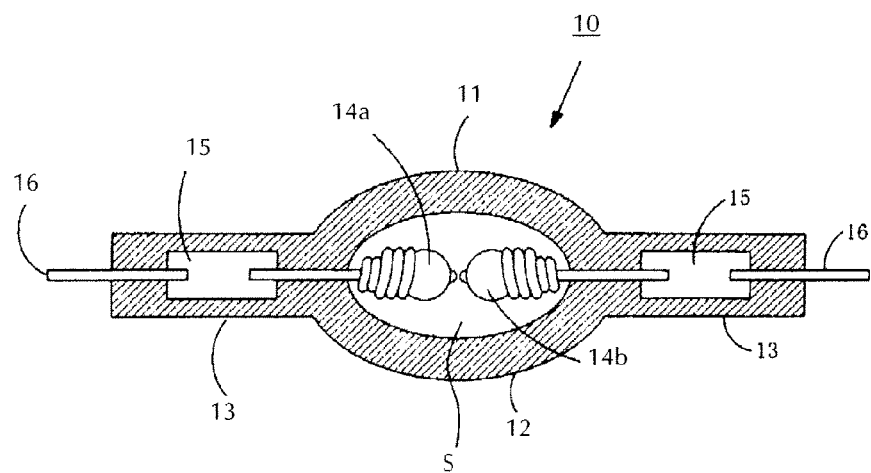
FIG. 1 is a schematic view showing the configuration of a high pressure discharge lamp according to the present invention.
Figure 2:
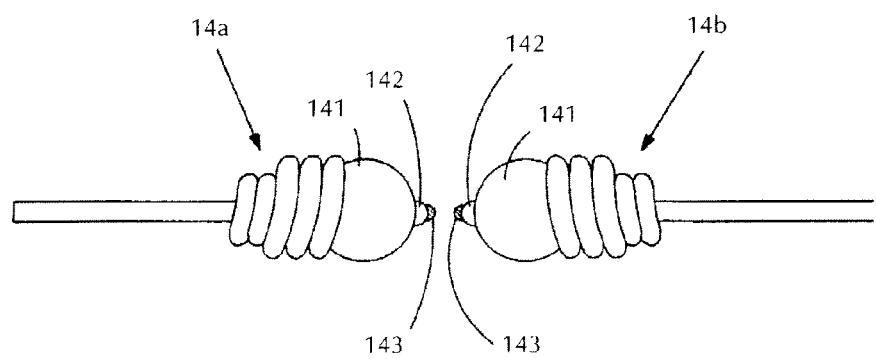
FIG. 2 is a schematic view explaining the state of the electrode tip ends at the time of the low electric power lighting of the high pressure discharge lamp of the present invention.

FIG. 1 is a view showing the configuration of a high pressure discharge lamp according to the present invention, and FIG. 2 is a view showing an example for the configuration of the electrodes of this discharge lamp.

As shown in FIG. 1, a discharge vessel 11 of a discharge lamp 10 is made from quartz glass and is configured such that it is provided with an approximately oval spherical light emission tube part 12 and rod shaped sealing tube parts 13 connected to both ends thereof.

In the interior of the light emission tube part 12 a pair of electrodes 14a, 14b made from tungsten is arranged oppositely to each other with a spacing of at most 2 mm between the electrodes. At the time of the low electric power lighting the electrodes 14a, 14b have, as is shown in FIG. 2, a spherical part 141, a primary projection 142 formed at the tip end of the spherical part 141 and a secondary projection 143 formed at the tip end of the primary projection.

At the time of the steady-state lighting, the high pressure discharge lamp 10 according to this embodiment is lighted by means of the alternating current lighting mode, and the configuration of the electrodes 14a, 14b is completely the same to facilitate the thermal design at the time of the steady-state lighting.

A band-shaped metal foil 15 made from molybdenum is embedded into the interior of the sealing parts 13. The shaft part of the electrode 14a, 14b is connected to the light emission tube part 12 side of the metal foil 15, while an outer lead rod 16 is connected to the other end.

In the interior of the light emission tube part 12 a discharge space S is formed in which mercury being the discharge medium, a rare gas and a halogen gas are enclosed.

The mercury serves to obtain the necessary visible light wavelength, for example discharge light with a wavelength of 360 to 780 nm, and is enclosed in an amount of at least 0.15 mg/mm$^3$. This enclosed amount can differ according to the temperature conditions, but serves to form an extremely high vapor pressure of at least 150 atm at the time of lighting. By enclosing even more mercury a discharge lamp with a high mercury vapor pressure of at least 200 atm or at least 300 atm at the time of lighting can be produced and the higher the mercury vapor pressure becomes, the more it becomes possible to produce a light source suited for a projector device.

The rare gas is enclosed with a static pressure of approximately 10 to 26 kPa. Concretely, it is argon gas, and the inclusion of such a rare gas serves to improve the lighting starting characteristics.

Regarding the halogen, iodine, bromine or chlorine etc. is enclosed in the form of a compound with mercury or another metal, and the enclosed amount of the halogen is chosen from a range between $10^{-6}$ to $10^{-2}$ μmol/mm$^3$. Although the halogen serves also to extend the durability (to prevent blackening) using the halogen cycle, in case of lamps being extremely small and having a high internal pressure such as the discharge lamp of the present invention it has the function to prevent devitrification of the light emission tube 10. And further, a metal halide may also be contained in the discharge space S as another discharge medium.

To show a concrete numerical example for such a high pressure discharge lamp, for example the maximum outer diameter of the light emission tube part 12 is 10 mm, the spacing between the electrodes is 1.0 mm, the internal volume of the discharge vessel 11 is 60 mm$^3$, the nominal voltage is 75 V and the nominal electric power is 200 W. The lamp is lighted by means of the alternating current mode.

This kind of discharge lamp is mounted in small-scale projector devices, and because a high quantity of light is required despite the fact that the whole dimensions of the device are extremely small, the thermal conditions in the light emission tube part 11 are extremely severe and the value of the tube wall load of the lamp becomes 0.8 to 3.0 W/mm$^2$ and concretely 2.1 W/mm$^2$. Because of the fact that the lamp has such a high mercury vapor pressure and tube wall load value, discharge light with good color rendering properties can be provided when it is arranged in a device for presentation such as a projector device.

When lighting the lamp in a low electric power range of 40 to 70% of the nominal electric power, it is possible to light stable without movements of the starting point and to avoid wear of the electrodes when the lighting conditions discussed below are employed.

In the present invention, the frequency range of the base current at the time of lighting with low electric power is 100 Hz to 5 kHz. The mode operating with an electric power value of 40 to 70% on average as to the nominal power consumption is called 'low electric power lighting mode'.

Figure 3A:
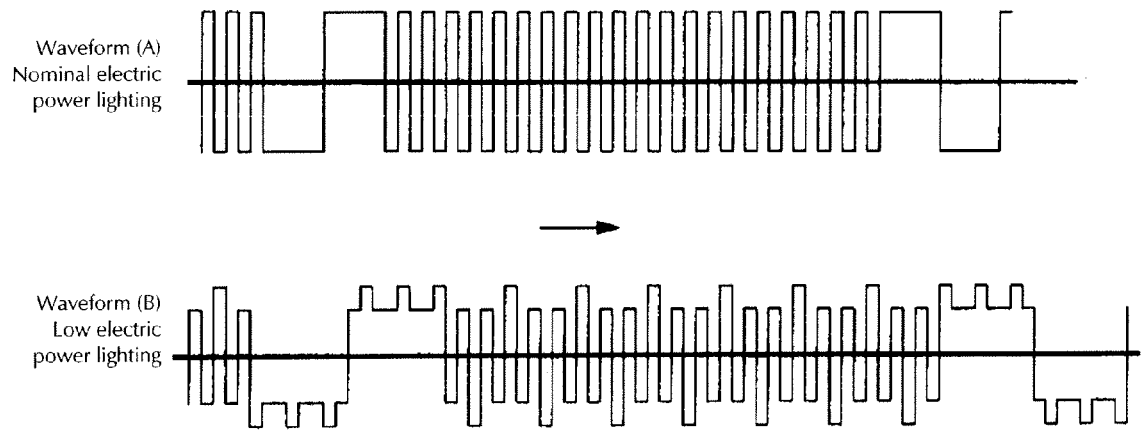
FIGS. 3(a) and 3(b) are schematic views showing an example for the lighting waveforms according to the present invention.
Figure 3B:
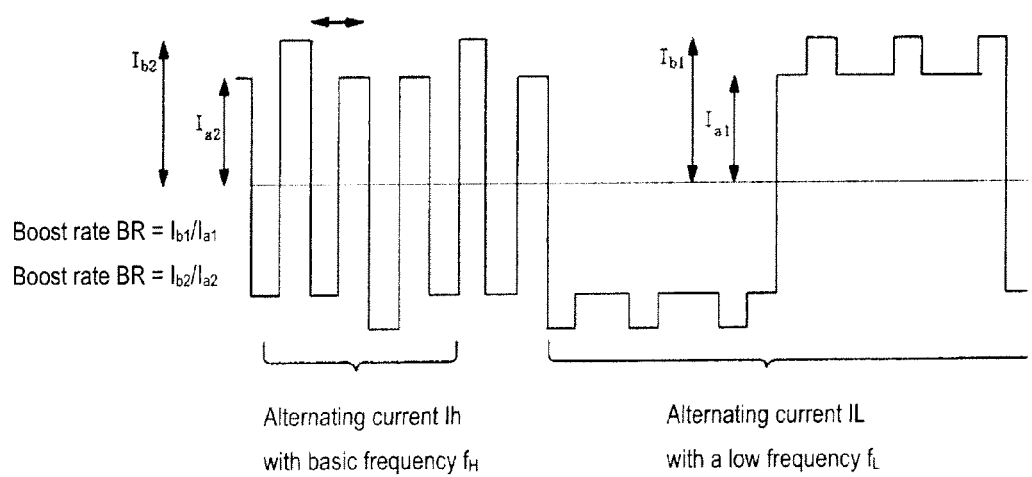

FIG. 3 is an example for the lighting waveform. FIG. 3(a) shows the nominal lighting waveform and the low electric power lighting waveform, while FIG. 3(b) is an enlarged view of the low electric power lighting waveform.

The waveform A shows the waveform of the current when lighting in the nominal (steady-state) lighting mode, and the waveform B shows the waveform of the current when lighting in the low electric power lighting mode. The vertical axes in the drawings express the current value, and the horizontal axes express the time.

At the time of the steady-state lighting (at the time of the normal mode or the eco mode) the lamp is lighted with the waveform A, while at the time of the low electric power lighting (super-eco mode) it is lighted by switching to the waveform B of FIG. 3(a). With the waveform A at the time of the steady-state lighting (at the time of the normal mode or the eco mode), the high pressure discharge lamp is supplied with an alternating current not imparting a boost current and having a frequency chosen from the range between 100 and 5 kHz as the steady-state lighting frequency.

A concrete numerical example for the waveform A is given below:
Waveform A at the time of the steady-state lighting:
Nominal power: 200 W (for example 80 V, 2.5 A)
Steady-state lighting frequency: 370 Hz
Low frequency: 46.25 Hz
Length of low frequency: 1 cycle
Interval between the generation of a low frequency and the generation of the next low frequency: 0.1 sec.

With the waveform B at the time of the low electric power lighting mode (at the time of the super-eco mode), a base lighting, at which an alternating current Ih having a current value Ia2 (being referred to as 'base current value') with a steady-state lighting frequency chosen from the range between 100 Hz and 5 kHz is supplied, and a low frequency lighting, at which an alternating current IL having a current value Ia1 (being referred to as 'low frequency current value') with a lower frequency than this steady-state lighting frequency is supplied, are performed alternatingly, as is shown in FIG. 3(b). And, during a half cycle of this alternating current with a low frequency, a boost current Ib1 which is increased according to the boost rate (boost current Ib1/base current Ia1) is supplied at least two or more times, while at the time of the base lighting a second boost current Ib2 which is increased according to the boot rate (boost current Ib2/base current Ib2) is supplied periodically.

As one example for the concrete method, the lighting is performed such that an alternating current with the low electric power frequency (base frequency) is supplied and once at its polarity a current which is increased according to the boost rate (1.2 to 3.5) with regard to the steady-state current is outputted and supplied with an interval period of 0.5 ms to 400 ms, and while further a low frequency of 10 to 200 Hz is inserted, the boost current is supplied a plurality of times during the time of a half wave of the low frequency. The insertion interval of the low frequency is preferably 0.0002 to 0.4 sec.

It is also possible to change the insertion interval at the time of the lighting with the base frequency and the time of the lighting with a low frequency as mentioned below, and it is also possible to contemplate the arrangement of the lamp and to change the period of the boost at the one electrode and the other electrode of the lamp.

A concrete numerical example for the waveform B is given below:

Waveform B at the time of the low electric power lighting:
Power: 120 W (for example 80 V, 1.5 A)
Low electric power lighting frequency: 740 Hz
Low frequency: 92.5 Hz
Length of low frequency: 1 cycle
Interval between the generation of a low frequency and the generation of the next low frequency: 0.1 sec
Boost rate: 2.5
Boost interval (c): 0.0014 sec.

Figures 4A, 4B:
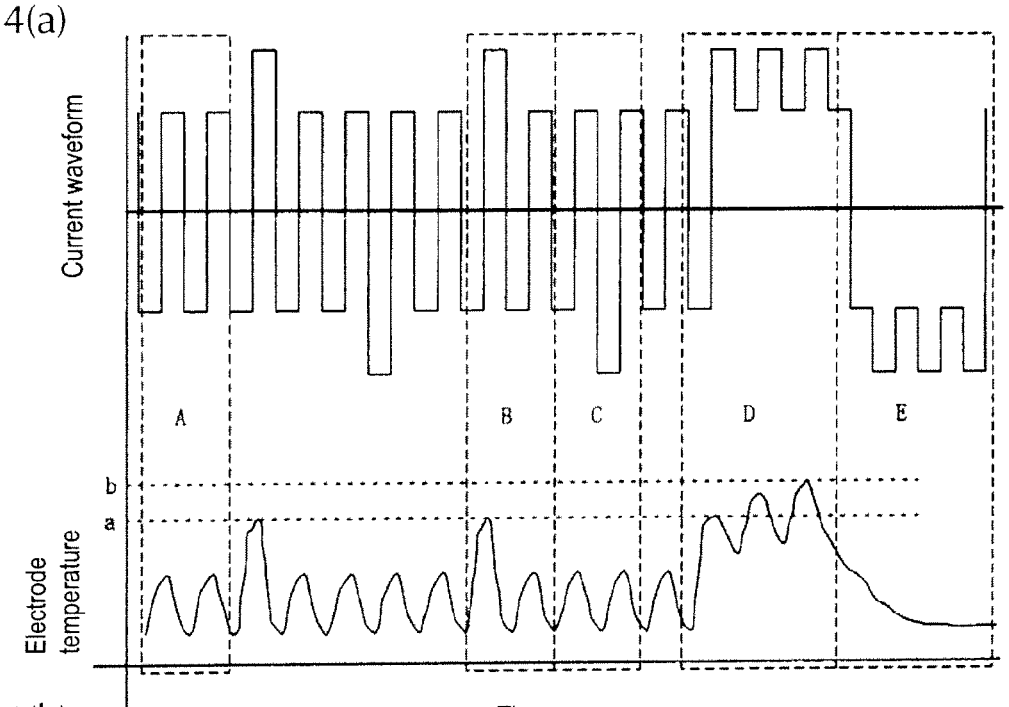
FIG. 4 is a schematic view showing an example for the lighting waveform at the time of the low electric power lighting (FIG. 4(a)) and the temperature in the vicinity of the tip end part of an electrode (FIG. 4(b)).

FIG. 4 is a view showing an example for the lighting waveform at the time of the low electric power lighting and the temperature in the vicinity of the tip end part of an electrode. FIG. 4(a) shows the lighting waveform, while FIG. 4(b) shows the temperature in the vicinity of the tip end part of an electrode. The lamp is provided with a pair of electrodes, but FIG. 4(b) shows the temperature of one of them.

As shown in the sections D and E in FIG. 4(a), during a half cycle of the alternating current with a low frequency a boost current having a larger current value than the current value of the alternating current is supplied two or more times, and further also during the supply of the above mentioned alternating current with the steady-state lighting frequency a second boost current having a larger current value than the current value of this alternating current is supplied, as is shown in the sections B, C etc. of FIG. 4(a).

By means of superimposing the boost current during the low frequency two or more times on a half wave, as is shown in the sections D and E of FIG. 4(a), at the time of the lighting in the low electric power mode, it was possible to bring the temperature of the electrode tip end part momentarily to a higher state, as is mentioned above, and a significant impact on the forming, maintenance and growth of the projections could be confirmed. Also with a lamp at the end of its life cycle a growth of the projections could be confirmed, and also an important effect with regard to the prolongation of the durability of the lamp could be confirmed. When, as hitherto, merely a low frequency is inserted at the time of the low electric power lighting, the projection growth ability with regard to the lamp at the end of its life cycle is small.

Irrespective of the nominal power lighting and the low electric power lighting, the mechanism of the growth of the projections is, in general, thought to be as follows:

The tungsten (electrode forming material) having evaporated during the lighting from the high temperature part in the vicinity of the electrode tip end and the vicinity of the outer periphery of the electrode exposed to the radiation heat of the arc bonds to the halogen and the residual oxygen present in the light emission tube and, in case of the halogen being Br, is present as tungsten compounds like $WBr$, $WBr_2$, $WO$, $WO_2$, $WO_2Br$, $WO_2Br_2$ etc. These compounds decompose in the high temperature part in the gaseous phase in the vicinity of the electrode tip end part and become tungsten atoms or cations. Because of the thermal diffusion (diffusion of the tungsten atoms from within the arc=the high temperature part in the gaseous phase towards the vicinity of the electrode tip end=the low temperature part) and the fact that the tungsten atoms ionize within the arc, become cations and are attracted towards (drift to) the direction of the cathode because of the electric field at the time of the cathode operation, the tungsten vapor density in the gaseous phase in the vicinity of the electrode tip end becomes high, a precipitation at the electrode tip end occurs and a projection is formed.

As in the present embodiment the boost current is supplied such as shown in FIG. 4, it is thought that the projection grows as follows.

When lighting with low electric power, in the case of the prior art technique (no boost current is superimposed) (section A in FIG. 4(a)) the electrode temperature changes with a constant interval because of the polarity reversal by means of the alternating current lighting, but the maximally reached temperature does not reach line a in FIG. 4(b). In the present embodiment on the other hand, a low frequency is inserted as shown in sections D and E of FIG. 4(a) and during that half wave a boost current is supplied a plurality of times. Therefore the temperature of the electrode, after having reached line a in FIG. 4(a), rises to line b.

The reason is that the temperature of the electrode rises significantly when the first boost current is supplied during the low frequency period, the temperature of the electrode reaches line a of FIG. 4(b), and afterwards decreases temporarily because of the change of the supplied current. But unlike the case of the polarity reversal the electrode temperature does not decrease completely. As after that again a boost current is applied before the temperature decreases too much it becomes possible that the temperature rises even higher than the electrode temperature of the first boost current supply, and the temperature of the electrode can rise up to line b in FIG. 4(b). Because of the above mentioned reason the electrode tip end temperature reaches line b of FIG. 4(b).

It is presumed that because the temperature of the electrode tip end reaches a higher state than hitherto by means of supplying the boost current a plurality of times during the low frequency lighting, more tungsten atoms or tungsten ions are present in the vicinity of the arc. It is thought that because more tungsten atoms or ions are present than hitherto, more tungsten can be accumulated at the electrode tip end when the polarity of the applied voltage is reversed, and as a result the projection can be thickened and can be formed larger.

Then, in the present embodiment a second boost current is supplied also during the supply of the alternating current with the steady-state lighting frequency, as is shown in sections B and C of FIG. 4(a). By means of the supply of a second boost current in the sections B and C as shown in FIG. 4(a), the tip end temperature of the electrode can rise up to line a, as is shown in FIG. 4(b). Therefore, the secondary projection can be maintained and the problem of flicker can be solved.

As, in this case, the tip end temperature of the electrode rises to not more than line a, it is not possible to grow the projection of the electrode tip end such as mentioned above by all means, but because of the supply of the second boost current the secondary projection can be maintained and the brightness difference between the alternating current lighting with the steady-state lighting frequency and the alternating current lighting with a low frequency can be eliminated.

In the following, the mechanisms which can exert a large effect on the avoidance of flicker and the forming, maintenance and growth of the projection are explained in detail by means of FIGS. 4, 5 and 6. FIGS. 5 and 6 show the current waveform, the electrode temperature and the electrode state at the time of the steady-state lighting and at the time of the low electric power lighting, and the numbers in these figures correspond to the sections A to E in FIG. 4(a).

FIG. 5 (a) shows the current waveform and the electrode state at the time of the steady-state lighting. In this case, sufficient current is supplied with regard to the electrode size, and the arc is stable.

FIGS. 5 (b) and (c) show the case of lighting with the lighting waveform of section A in FIG. 4(a), wherein in the state (b) the current is insufficient with regard to the electrode size, the electrode temperature does not rise, and, as shown in (c), because of the lack of current secondary projections start to form.

FIG. 5 (d) shows the case of lighting with the lighting waveform of section B in FIG. 4(a). Because a second boost current is supplied to the electrode on one side the electrode temperature rises and the secondary projection on the one side vanishes.

FIG. 6 (*e*) shows the case of lighting with the lighting waveform of section C in FIG. 4(*a*). Because a second boost current is also supplied to the electrode on the other side, the secondary projections of both electrodes vanish.

FIG. 6 (*f*) shows the case of lighting with the lighting waveform of section D in FIG. 4(*a*). A first boost current is supplied a plurality of times at the half wave during the low frequency period, the electrode temperature increases significantly, and, as shown in the same drawing, the tungsten (W) evaporates.

FIG. 6 (*g*) shows the case of lighting with the lighting waveform of section E in FIG. 4(*a*). By means of changing the polarity of the electrode on the side already having been supplied with the boost current, as shown in the same drawing the temperature decreases and at the same time the tungsten (W) is attracted to the electrode and accumulates at the primary projection. The electrode temperature of the electrode on the opposite side increases significantly like in the above mentioned FIG. 6 (*f*) and the tungsten evaporates.

FIG. 6 (*h*) shows the state in which the supply of the above mentioned boost current has ended and a return to the lighting waveform of section A in FIG. 4(*a*) has taken place. Also at the electrode on the opposite side the same behavior as in the above FIG. 6 (*g*) occurs, the temperature decreases and at the same time the tungsten (W) is attracted to the electrode and accumulates at the first projection. Thus, the growth of the projections on both sides is effected.

Figure 7:
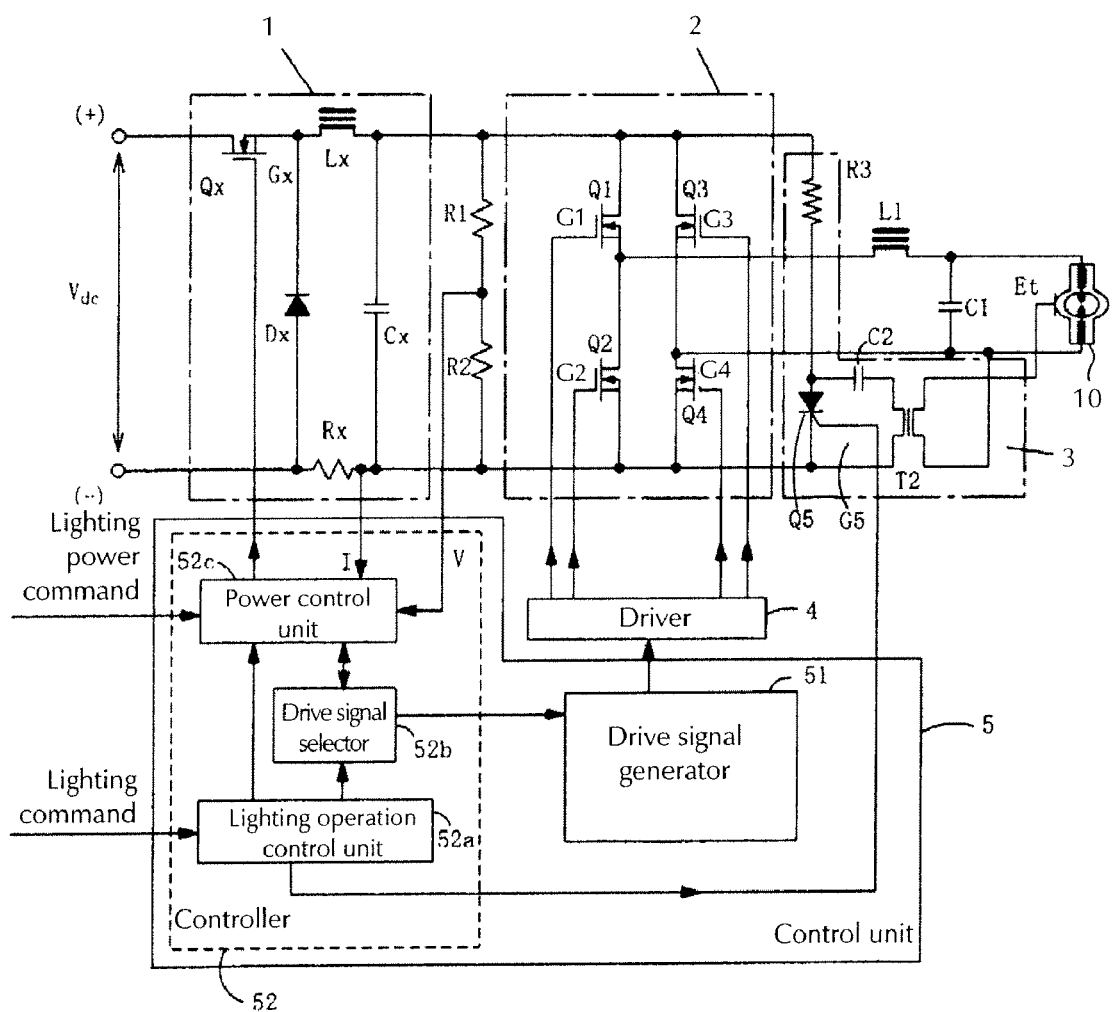
FIG. 7 is a schematic view showing an example for the configuration of the lighting device according to the present invention.

FIG. 7 shows an example for the configuration of the lighting device (current supply device) of the embodiment of the present invention.

The lighting device comprises a step-down chopper circuit 1 being supplied with a direct current voltage, a full-bridge type inverter circuit 2 (in the following referred to as 'full-bridge circuit') which is connected to the output side of the step-down chopper circuit 1, converts the direct current voltage to an alternating current voltage and supplies it to the discharge lamp, a coil L1, a capacitor C1 and a starter circuit 3 which are connected in series to the discharge lamp 10, a driver 4 which drives switching elements Q1 to Q4 of said full-bridge circuit 2, and a control unit 5. The control unit 5 may consist of a processing device such as a microprocessor, and here its functional configuration is shown by means of a block diagram.

In FIG. 7, the step-down chopper circuit 1 consists of a switching element Qx and an inductor Lx which are connected to the plus terminal of the power source being supplied with a direct current voltage, a diode Dx the cathode side of which is connected between the connection point of the switching element Qx and the inductor Lx and the minus terminal of the power source, a smoothing capacitor Cx which is connected to the output side of the inductor Lx, and a resistor Rx for the current detection, which is connected between the minus terminal side of the smoothing capacitor Cx and the anode side of the diode Dx.

By means of driving said switching element Qx with a defined duty, the input direct current voltage Vdc is stepped down to a voltage corresponding to this duty. At the output side of the step-down chopper circuit 1, a series circuit of resistors R1, R2 for the voltage detection is provided.

The full-bridge circuit 2 consists of the switching elements Q1 to Q4 which are connected in the shape of a bridge, and by means of alternatingly switching the switching elements Q1, Q4 and the switching elements Q2, Q3 on, a rectangular wave shaped alternating current voltage is generated between the connection point of the switching elements Q1, Q2 and the connection point of the switching elements Q3, Q4.

The starter circuit 3 consists of a series circuit of a resistor R3 and a switching element Q5, a capacitor C2 and a transformer T1. When the switching element Q5 is switched on, the electric load charged in the capacitor C2 is discharged via the switching element Q5 and the primary side coil of the transformer T1, and a pulse shaped high voltage is generated in the secondary side of the transformer T1. This high voltage is applied to the auxiliary electrode Et of the lamp 10, and the lamp is lighted.

In the above mentioned circuit, the control of the output electric power and the regulation of the above mentioned boost rate can be achieved by regulating the operating duty of the switching element Qx of the step-down chopper circuit 1.

The switching element Q5 of the step-down chopper circuit 1 switches on and off according to the duty of the gate signal Gx, and the electric power supplied to the lamp 10 changes. That means, a control of the gate signal Gx is performed such that in case of a power-up the duty of Qx is increased and in case of a power-down the duty of Qx is decreased and an electric power value is obtained which corresponds to the input electric power regulation signal value. At the time of a boost, the duty of Qx is increased and a boost current with a larger current value than the base current value flows.

The regulation of the alternating current driving frequency is realized by regulating the switching cycle of the switching elements Q1 to Q4 of the full-bridge circuit 2.

The control unit 5 consists of a drive signal generator 51 and a controller 52. The drive signal generator 51 consists, for example, of a processor and generates drive signals to drive the switching elements Q1 to Q4 of the full-bridge circuit 2.

The controller 52 is provided with a lighting operation control unit 52*a* which controls the lighting operation of the lamp 10, a drive signal selector 52*b* which controls the output of the drive signal generator 51, and a power control unit 52*c* which drives the switching element Qx of the step-down chopper circuit 1 according to an external lighting power command with a defined duty and controls the lamp power.

The power control unit 52*c* determines the lamp current I and the lamp voltage V and calculates the lamp power from the voltage at both terminals of the resistor Rx for the current detection and the voltage detected by the resistors R1 and R2 for the voltage detection and controls the duty of the switching element Qx of the step-down chopper circuit 1 such that this power corresponds to the lighting power command. And it distinguishes from the value of the lighting power command between the nominal lighting and the low electric power lighting and sends the result of the distinction to the drive signal selector 52*b*.

When the power control unit 52*c*, or the lighting power command signal, switches to the low electric power lighting mode by means of switching to the dimming or the super-eco mode, the low electric power lighting signal is sent to the drive signal selector 52*b*. The drive signal selector 52*b* sends a drive signal selection signal corresponding to this low electric power signal to the drive signal generator 51. The drive signal generator 51 generates a drive signal according to the drive signal selection signal and sends it to the driver 4. For example, at the times of the nominal lighting and the low electric power lighting, a drive signal with a corresponding frequency is outputted while at the boost time a drive signal corresponding to a boost signal is outputted.

The full-bridge circuit 2 performs a polarity reversing operation according to the drive signal from the driver.

At the boost time the drive signal selector 52*b* sends a boost signal to the power control unit 52*c*, and the power control unit 52c boosts (enlarges) the output electric power as mentioned above at the time the boost signal is outputted.

In the following, the operation of the lighting device of the present invention will be explained.

When a lighting command is issued, the power supply to the lamp 10 starts and the lighting operation control unit 52a of the controller 52 generates a starter circuit drive signal, the starter circuit 3 is triggered and the lamp 10 is lighted. When the lamp 10 lights, the lighting power is calculated in the power control unit 52c from the voltage value V detected by the voltage dividing resistors R1, R2 and the current value I detected by the resistor Rx. The power control unit 52c of the controller 52 controls the switching element Qx of the step-down chopper circuit 1 based on the lighting power command signal and the above mentioned calculated electric power details and controls the lighting power. That is, the switching element Qx of the step-down chopper circuit 1 changes according to the duty of the gate signal Gx, and when a lighting power command (electric power regulation signal) is inputted from the outside, the duty of the switching element Qx is increased in case of a power-up, or the duty of the switching element Qx is decreased in case of a power-down, and a control of the gate signal Gx is performed such that an electric power value (electric power regulation signal) corresponding to the inputted lighting power command is obtained.

At the steady-state lighting time with a high lighting power command value (larger than 70% of the nominal electric power of the lamp), the drive signal selector 52b of the controller 52 outputs a drive signal having been determined beforehand corresponding to the steady-state lighting time by the drive signal generator 51 and drives the driver 4. In accordance with the steady-state lighting signal from the drive signal selector 52b, the power control unit 52c sets the output electric power to the steady state lighting electric power. By means of this, the full-bridge circuit 2 performs a polarity reversing operation according to the drive signal from the driver 4 and the lamp 10 lights with the waveform of the nominal electric power lighting mode. The lighting frequency at this time is driven with 100 Hz to 5 kHz, and it is also possible that a low frequency driven, as a whole, with 5 to 200 Hz is inserted.

At the low electric power lighting time with a low lighting power command value, that is, at most 70% of the steady-state power (practically 40 to 70%), the drive signal selector 52b of the controller 52 outputs a drive signal having been determined beforehand corresponding to the low electric power lighting time by the drive signal generator 51 and drives the driver 4. In accordance with the low electric power lighting signal from the drive signal selector 52b the power control unit 52c sets the output electric power to the low electric power lighting power. By means of this, the full-bridge circuit 2 performs a polarity reversing operation according to the drive signal from the driver 4 and the lamp 10 lights with the waveform B of the low electric power lighting mode shown in FIG. 3. That is, the drive is performed with a lighting frequency of 100 Hz to 5 kHz, the boost current is inserted in intervals from 0.5 ms to 400 ms, a low frequency driven with, as a whole, 5 to 200 Hz is inserted, and during its half wave said boost current is inserted two or more times.

Figure 8A:
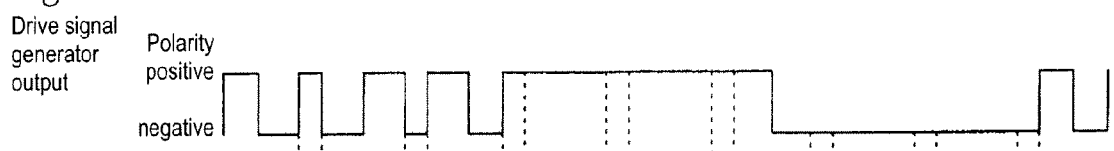
FIGS. 8(a) to 8(c) are schematic views explaining the boost lighting operation at the time of the low electric power lighting, with FIG. 8(a) showing the drive signal generator output, FIG. 8(b) the boost signal, and FIG. 8(c) the full-bridge output.

The mentioned boost lighting operation will be explained by means of FIG. 8. In FIG. 8, (a) is the drive signal containing a boost lighting signal outputted from the drive signal generator 51 at the time of the low electric power lighting, (b) is the boost signal, and (c) is the lamp current waveform (full-bridge circuit output) at the time of the low electric power lighting.

Figure 8B:
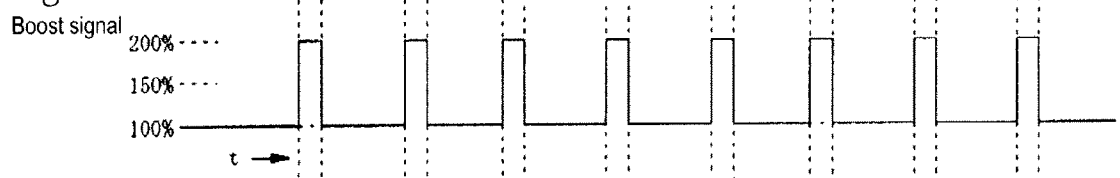
Figure 8C:
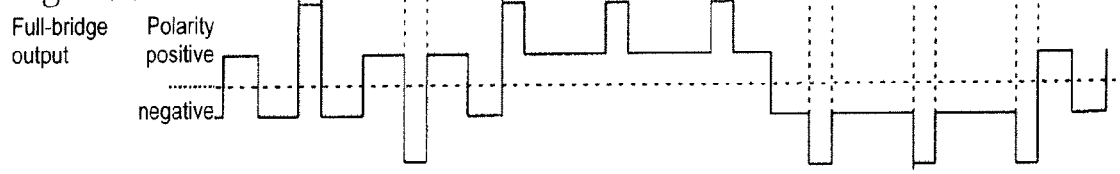

At the time of the low electric power lighting, the lighting operation control unit 52a outputs a boost signal with a determined cycle, as is shown in FIG. 8(b). In accordance with the boost signal, the drive signal selector 52b outputs the drive signal shown in FIG. 8(a) from the drive signal generator 51. The above mentioned boost signal is applied to the power control unit 52c, and the power control unit 52c increases the duty of the switching element Qx of the step-down chopper circuit 1 according to the boost signal and supplies a boost current being larger than the base current value. Therefore, as shown in FIG. 8(c), a boost current having a larger current value than the base current value is supplied to the lamp every time the boost signal is outputted.

Next, the lighting operation at the time of the low electric power lighting will be explained.

FIG. 9 is a view showing a first lighting waveform example (basically the same waveform as the waveform shown in the above mentioned FIG. 3(a), waveform B) at the time of the low electric power lighting and a concrete numerical example for it, and shows a case in which the boost widths at the time of lighting by means of a low frequency and at the time of lighting by means of the low electric power lighting frequency (base frequency) are the same and also the insertion periods are the same.

Figures 9A, 9B:
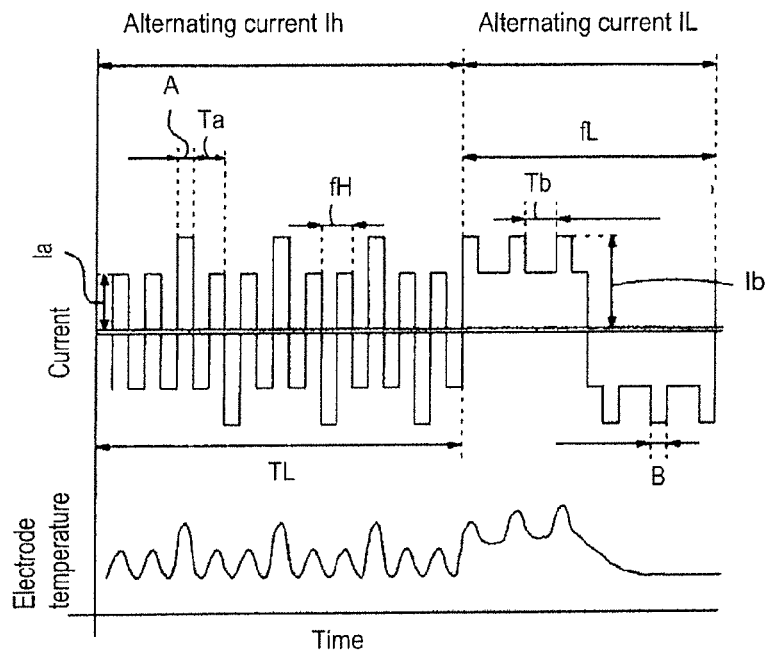
FIGS. 9(a) and 9(b) are a schematic view showing a first lighting waveform example at the time of the low electric power lighting and a table showing the relevant parameters, respectively.

FIG. 9(a) shows the lighting waveform and the electrode temperature, and FIG. 9(b) shows the frequency, the insertion period etc. Ih shows the alternating current with the low electric power lighting frequency (base frequency), and IL shows the alternating current with a low frequency.

The boost width A, B is the time during which the boost current is supplied, as is shown in the same drawing, the boost insertion period Ta, Tb is the time from the supply of a boost current to the supply of the next boost current, and the low frequency insertion period TL is the time from the insertion of the low frequency to the insertion of the next low frequency.

Figures 10A, 10B:
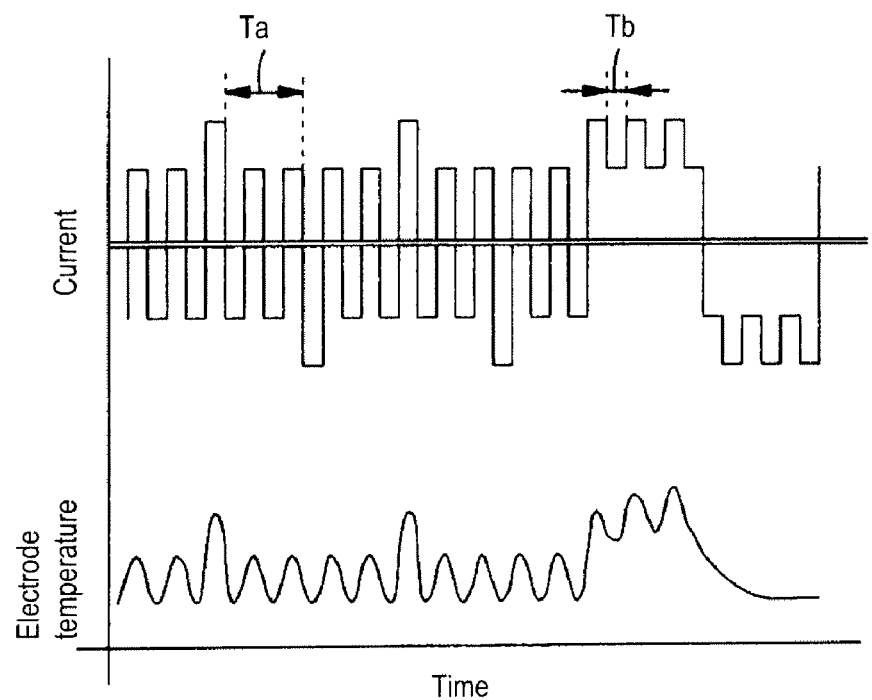
FIGS. 10(a) and 10(b) are a schematic view showing a second lighting waveform example at the time of the low electric power lighting and a table showing the relevant parameters, respectively.

FIG. 10 is a view showing a second lighting waveform example at the time of the low electric power lighting and a concrete numerical example for it, and shows a case in which the boost widths at the time of lighting by means of a low frequency and at the time of lighting by means of the low electric power lighting frequency (base frequency) are the same while the insertion periods are different.

Figures 11A, 11B:
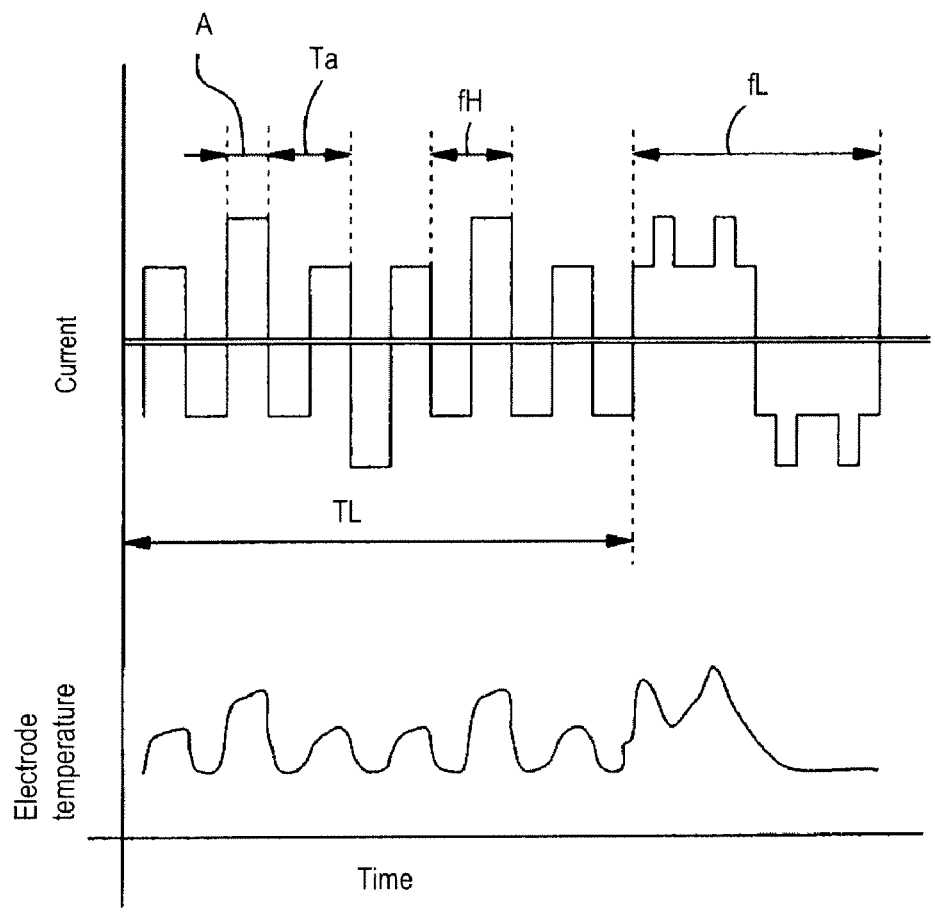
FIGS. 11(a) and 11(b) are a schematic view showing a third lighting waveform example at the time of the low electric power lighting and a table showing the relevant parameters, respectively.

FIG. 11 is a view showing a third lighting waveform example at the time of the low electric power lighting and a concrete numerical example, and shows a case in which the boost widths at the time of lighting by means of a low frequency and at the time of lighting by means of the low electric power lighting frequency (base frequency) as well as the insertion periods are different.

Figures 12A, 12B:
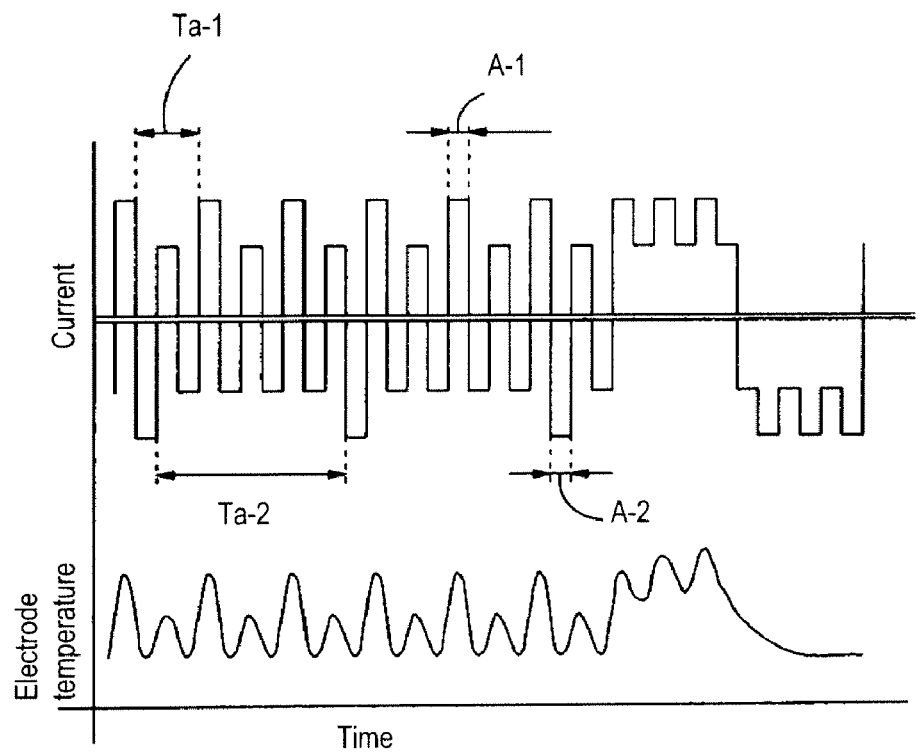
FIGS. 12(a) and 12(b) are a schematic view showing a fourth lighting waveform example at the time of the low electric power lighting and a table showing the relevant parameters, respectively.
Figure 14A:
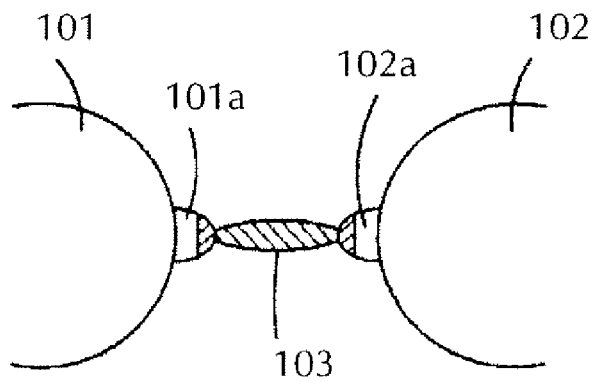
FIG. 14 is a schematic view explaining the electrode tip end shapes according to the prior art.
Figure 14B:
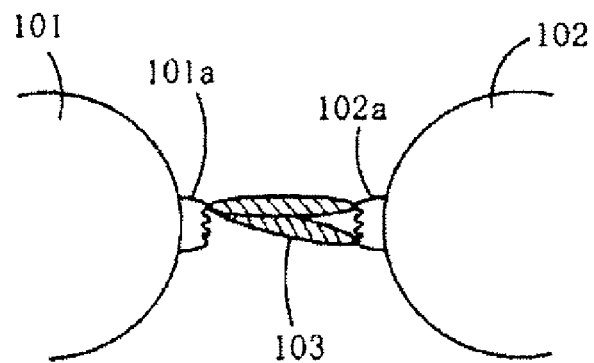
Figure 14C:
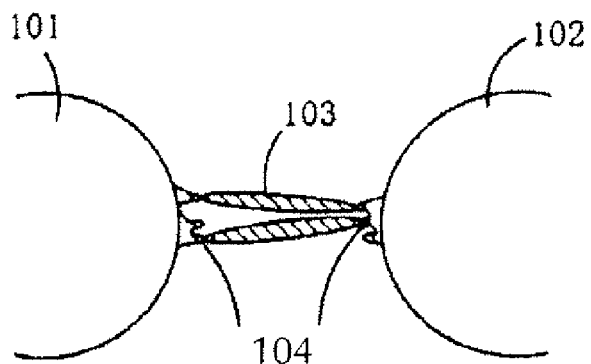

FIG. 12 is a view showing a fourth lighting waveform example at the time of the low electric power lighting and a concrete numerical example, and shows a case in which the insertion intervals are different according to the polarity. This is employed, for example, when the mutual electrode temperatures are not balanced because of the use of a subreflector mirror or the like.

Next, tests were conducted for the case in which, as hitherto, only a low frequency insertion at the time of the low electric power lighting was performed, and for the case of the supply of a boost current such as in the present invention, and the results of the present invention were confirmed.

FIG. 13 shows the test results. High pressure discharge lamps with nominal power consumptions of 200 W, 230 W and 275 W and power supply devices were used and the presence or absence of flicker was examined while several conditions in the low electric power lighting mode were changed. In this drawing, a generation of flicker is shown by 'x' and an absence of flicker is shown by 'O'. FIG. 13(a) shows the lamp configuration, the lighting conditions and the lighting with the prior art technique (A: lighting by the known technique), and (b) shows the lighting with the supply of a boost current such as in the present invention (B: lighting by the present invention). The lamp configurations and lighting conditions with the numbers (1) to (16) in FIG. 13(a) correspond respectively to the numbers (1) to (16) in FIG. 13(b).

When only an insertion of a low frequency at the time of the low electric power lighting was performed, as is shown in A of this drawing, the lighting power was small and, as shown in the same drawing, in all cases flicker was generated.

When a boost current was supplied, as is shown in B of this drawing, it could be confirmed that the flicker converged and the arc was stable even when the lamps were lighted with the same electric power as the electric power which generated flicker in A of FIG. 13.

What is claimed is:

1. A high pressure discharge lamp light source device comprised of
    a high pressure discharge lamp having a discharge vessel made from quartz glass and a pair of electrodes arranged oppositely to each other with a spacing of at most 2.0 mm, each electrode having a primary projection formed at a tip end thereof, and mercury of at least 0.20 mg/mm$^3$ and a halogen being enclosed in said discharge vessel; and
    a power supply device for supplying alternating current to said high pressure discharge lamp,
    wherein the power supply device, during steady state operation in a nominal electric power lighting mode, is coupled to switch from said nominal electric power lighting mode to a low electric power lighting mode, said current in the low electric power lighting mode having a defined current value in the range of 40 to 70% of a nominal electric power consumption, and wherein said power supply device, in the low electric power lighting mode, is coupled to alternatingly supply to said high pressure discharge lamp an alternating current with a steady-state lighting frequency selected from a range between 100 Hz and 5 kHz and an alternating current with a low frequency which is lower than said steady-state lighting frequency, and
    wherein the power supply device further supplies a boost current at least two times during a half cycle of said alternating current with a low frequency during the supply of said alternating current with a low frequency, said boost current having a current value which is larger than a current value of said alternating current with a low frequency in a manner minimizing the formation of a plurality of secondary projections on the electrodes.

2. The high pressure discharge lamp light source device of claim 1, wherein the power supply device further supplies a second boost current having a current value which is larger than a current value of the alternating current with a steady-state lighting frequency also during the supply of said alternating current with a steady-state lighting frequency.

* * * * *